Figure 1:
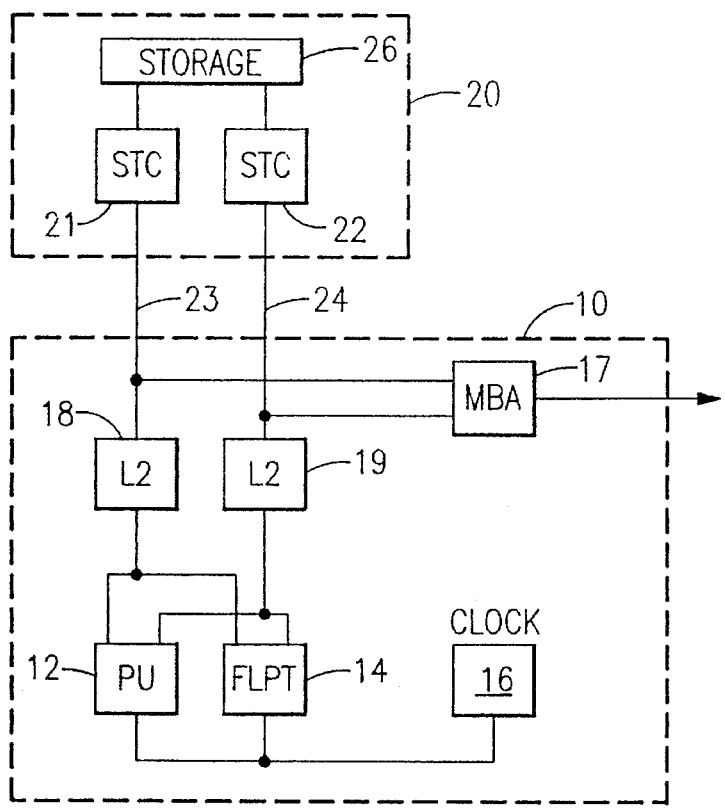

United States Patent [19]
Dao-Trong et al.

[11] Patent Number: 5,542,033
[45] Date of Patent: Jul. 30, 1996

[54] CORRECTION AND MODIFICATION OF MICROPROCESSOR CHIP OPERATIONS

[75] Inventors: Son Dao-Trong, Stuttgart; Juergen Haas, Tuebingen; Rolf Mueller, Boeblingen; Guenter Gerwig, Simmonzheim, all of Germany

[73] Assignee: International Business Machines Corporation, Armonk, N.Y.

[21] Appl. No.: 310,464

[22] Filed: Sep. 22, 1994

[30] Foreign Application Priority Data

Oct. 13, 1993 [EP] European Pat. Off. .............. 93116553

[51] Int. Cl.$^6$ ............................................. G06F 11/34
[52] U.S. Cl. ................... 395/182.08; 395/185.04
[58] Field of Search ........................ 395/575, 182.08, 395/185.04, 182.01; 371/11.1, 67.1, 25.1, 24, 22.5, 22.3, 22.2, 22.1, 25.1

[56] References Cited

U.S. PATENT DOCUMENTS 5,319,789  6/1994  Ehlig et al. .......................... 395/800

FOREIGN PATENT DOCUMENTS 0469239  2/1992  European Pat. Off. .
0428005  5/1991  Japan .
0514806  11/1992  Japan .

*Primary Examiner*—Robert W. Beausoliel, Jr.
*Assistant Examiner*—Phung My Chung
*Attorney, Agent, or Firm*—Lawrence D. Cutter

[57] ABSTRACT

A correction of microprocessor chip design errors is achieved by identifying selected sets of instructions and/or selected sets of instruction sequences in an erroneous control flow of the microprocessor and/or by identifying selected sets of interface control and status signals. A match selectively initiates a corrective action by interfering with the instruction flow in the microprocessor chip or by requesting external control from an associated processor unit. Alternatively, a match is used for a programmable modification of interface control and status signals to adapt the chip to changes of its environment without redesign.

12 Claims, 9 Drawing Sheets

CORRECTION AND MODIFICATION OF MICROPROCESSOR CHIP OPERATIONS

The invention relates to a method and a device for the correction and modification of the operation of processors chips in a multiprocessor computer system consisting of a number of single chip processors and a number of storage chips.

Although the logical design of microprocessor chips are usually verified by simulation, it is often unavoidable that the first delivery of a VLSI chip embodying the microprocessor contains design errors. Such errors may exist in false results obtained during the execution of certain instructions, in incorrect control of the instruction sequencing which in particular may arise in a pipelined microprocessor design, or in the occurrence of invalid parity checks. There may also arise synchronization problems between tightly coupled functional units such as the instruction execution unit, the mathematical coprocessor or the cache storages. The probability of defective design increases with the growing complexity and the increase of the number of circuits implemented on one chip. A redesign of the chip to correct the errors requires a modification of the design, a new test time consuming run by simulation, and a new production cycle. Until the redesigned chip version is available it may take months during that the computer system of which the microprocessor is a part of can not be continued to be tested or is prevented from productive utilization.

Microprocessor systems of the prior art try to avoid these difficulties by mounting on the chip card carrying the microprocessor chip an additional chip which takes over the function of a correction or replacement logic (IBM Technical Disclosure Bulletin, Vol. 19, No. 10, pages 3719–3722 and 3723–3725). The additional chip may for example be a programmable array logic (PAL). It receives input signals from the output of the microprocessor processor chip or may replace the latter with regard to certain input signals, and it will deliver corrected or otherwise modified output signals back to the microprocessor chip or instead of the latter to other functional units of the computer system.

Such "off-chip" logic necessitates a considerable rework and test expenditure. Control lines must be disconnected, diverted and reconnected to other positions. The additional chip requires additional space on the chip card which is mostly rare. If a PAL is used, adaptation of power and voltage levels may be required. In addition, the design of the correction or replacement logic is usually irreversible which mostly is also the case if a PAL is used. It is also difficult to scan or influence the off-chip functions and connections since they no longer belong to the chip internal test facilities such as the level sensitive scan design (LSSD). But even more important, the "off-chip" logic introduces additional logic stages in the control flow to detect the status of the control signals and to take the appropriate action to correct the operation where the limits for setup/hold and valid delays for the inputs/outputs may be exceeded. Furthermore, it is often difficult if not impossible, to access certain control signals within the microprocessor chip by chip external signals. To approach the latter problem it is known to enhance the designer's ability to debug and temporary fix a VLSI chip by implementing on the chip a function generator logic which can be controlled by the designer to generate and drive different functions off-chip (IBM Technical Disclosure Bulletin, Vol. 30, No. 7, December 1987, pages 20–22). There may be a plurality of function generators on the chip which are controlled by an equivalent number of scan-only registers to generate a signal from a Boolean combination of its inputs. The number and type of inputs to the function generator logic is fix, it will be predetermined during the initial design of the chip.

To increase the production yield and the reliability of VLSI memory chips it is also prior art to provide a memory capacity greater than the nominal capacity of the chip and provide an error correction circuitry on such chip (U.S. Pat. No. 4,335,459). The error correction circuitry uses well known error detection and correction techniques such as Hamming codes for data representation where a number of redundant bits are attached to and stored with each data word which then allow to a certain degree the correction of errors when that data word is read out of the memory chip. According to the same prior art, this arrangement is also used with single chip microprocessors including a random access memory and a read-only memory. In such case the correction circuitry is located between the processing unit and said memories.

It is an object of the invention to provide for a correction of microprocessor chip design errors by adaptive means which allow selective setting to detect a plurality of different design errors and to initiate selectable actions for their correction.

It is also an object of the invention to provide programmable means which allow interference with the instruction flow in a microprocessor chip to correct chip design errors.

It is a further object of the invention to selectively modify the interface control and status signals of a microprocessor chip.

For a single chip microprocessor which is part of a multiprocessor system the invention provides method steps and device means which allow identification of selected sets of instructions or selected sets of instruction sequences and which allow separably or in combination with the former identification selected sets of interface control and status signals. Match conditions signals are programmably assigned to escape signals which initiate a) a corrective action on chip level, b) a corrective action by the assistance of another processor unit or c) a modification of interface control and status signals of the microprocessor chip. By means of the invention a broad range of error conditions may be corrected or circumvented. The invention enables the designer and the maintenance engineer to detect complex error situations and to correct or circumvent simultaneously different classes of errors by programming.

Figure 2:
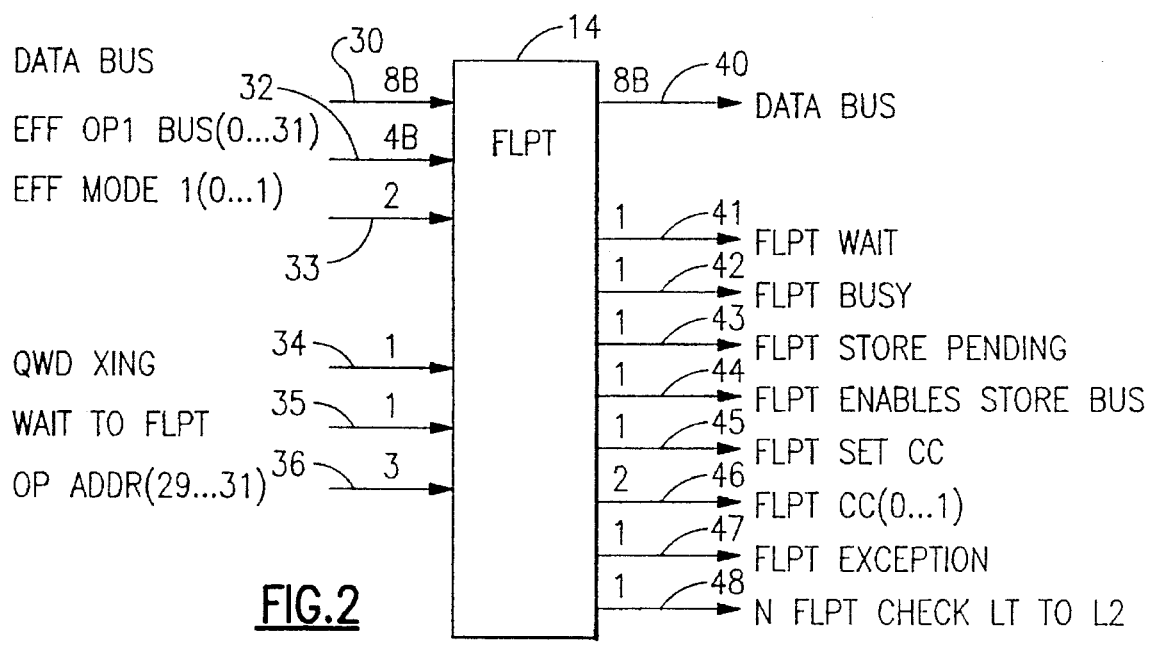
Figure 3:
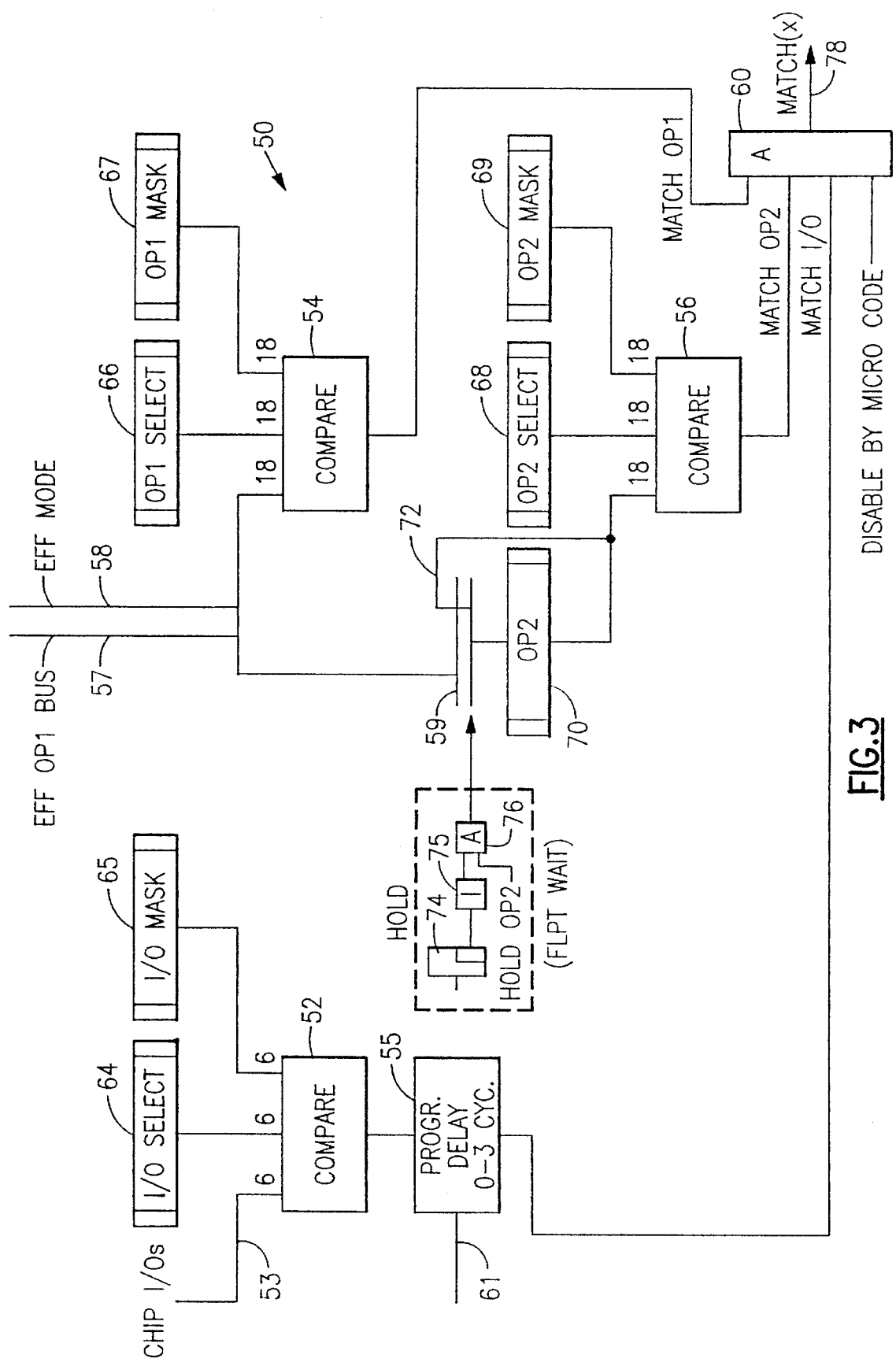
Figure 4A:
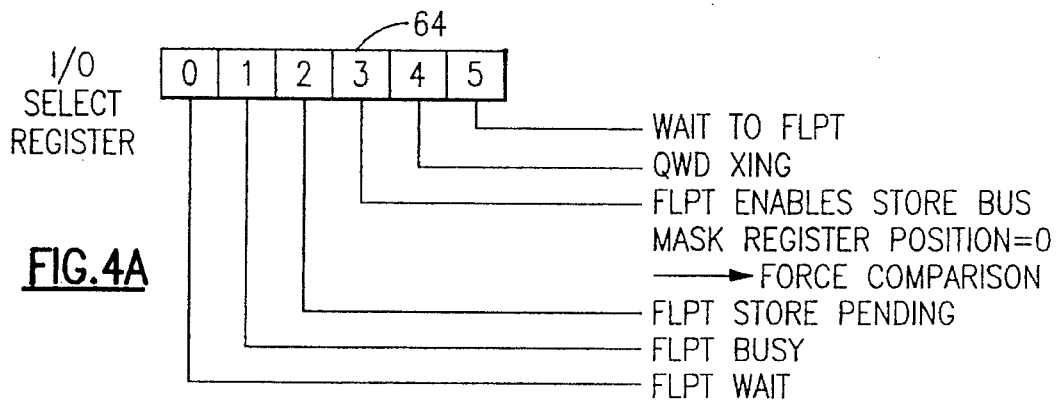
Figure 4B:
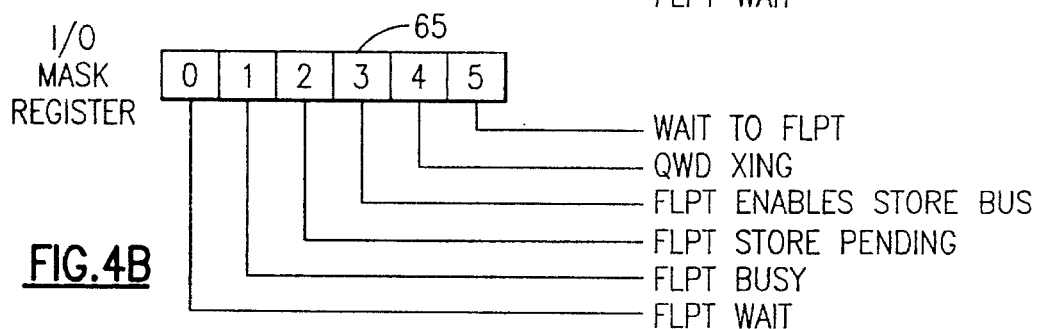
Figure 4C:
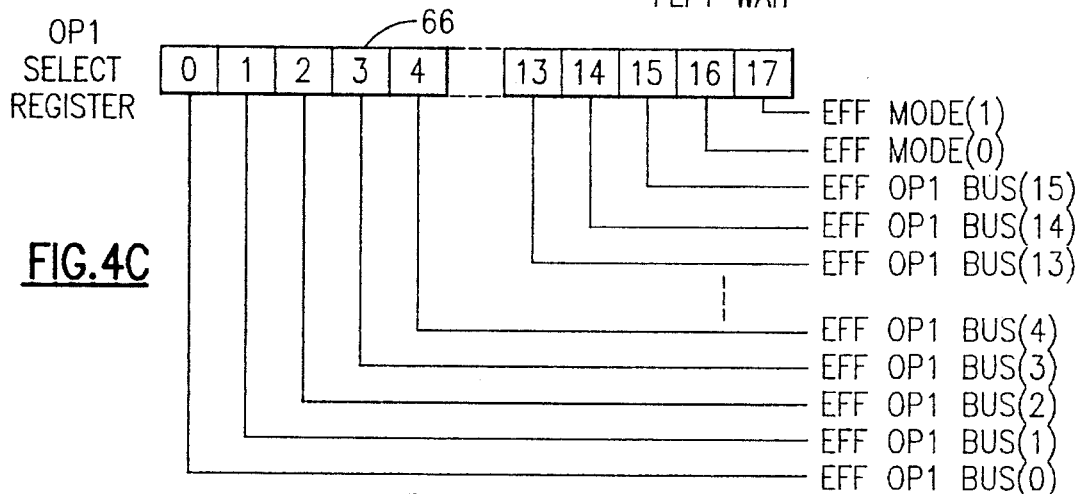
Figure 4D:
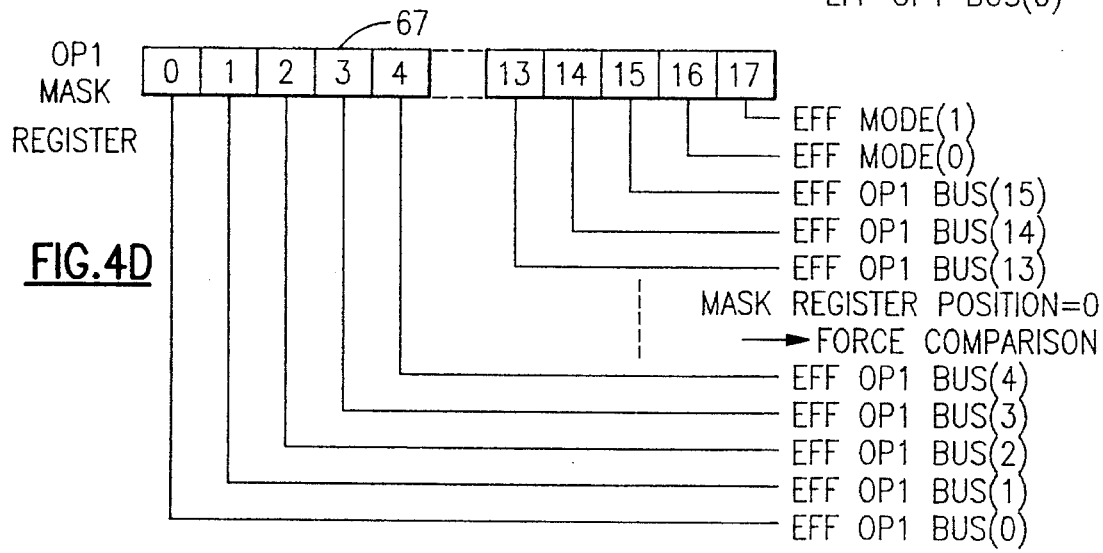
Figure 5:
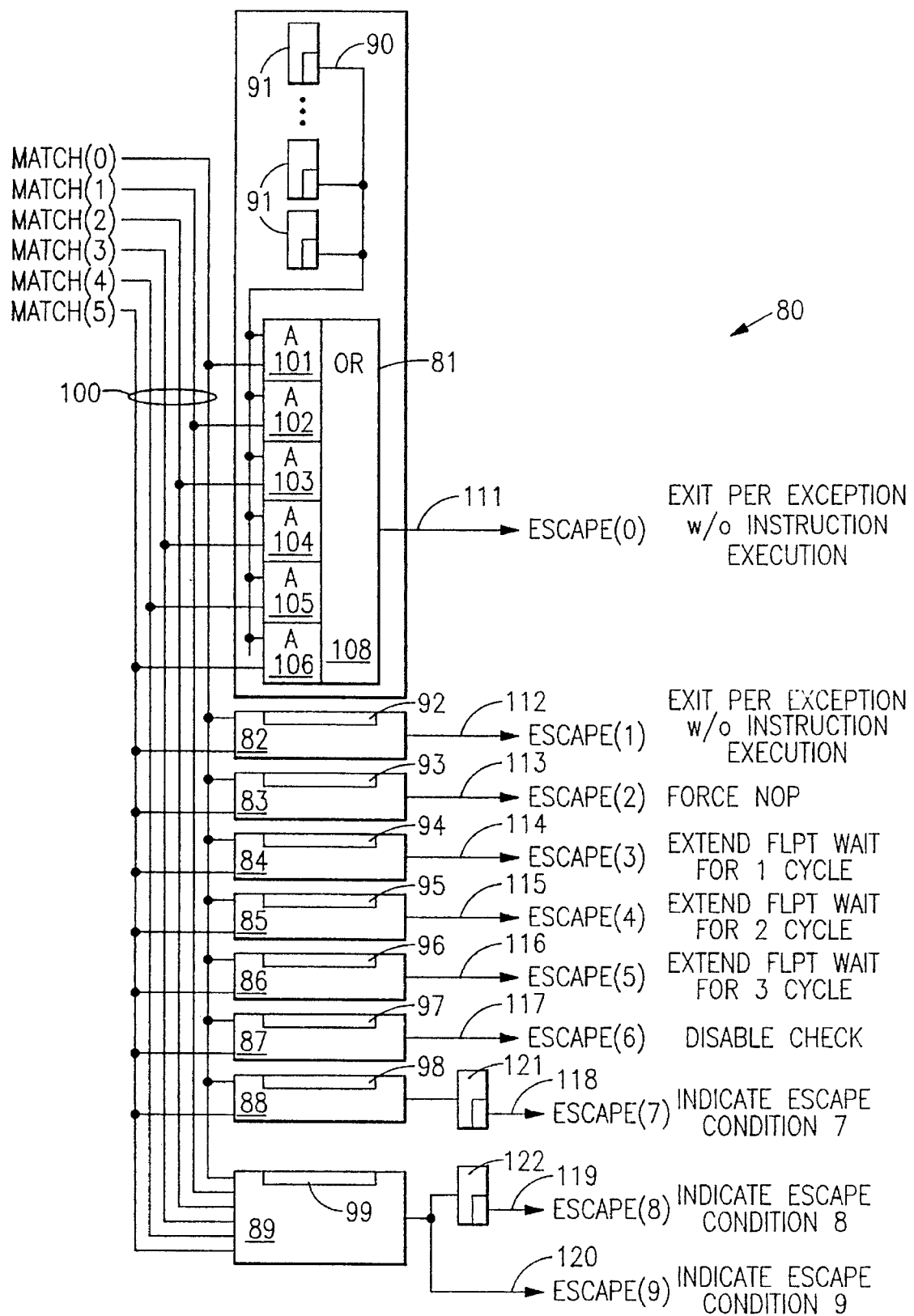
Figure 6A:
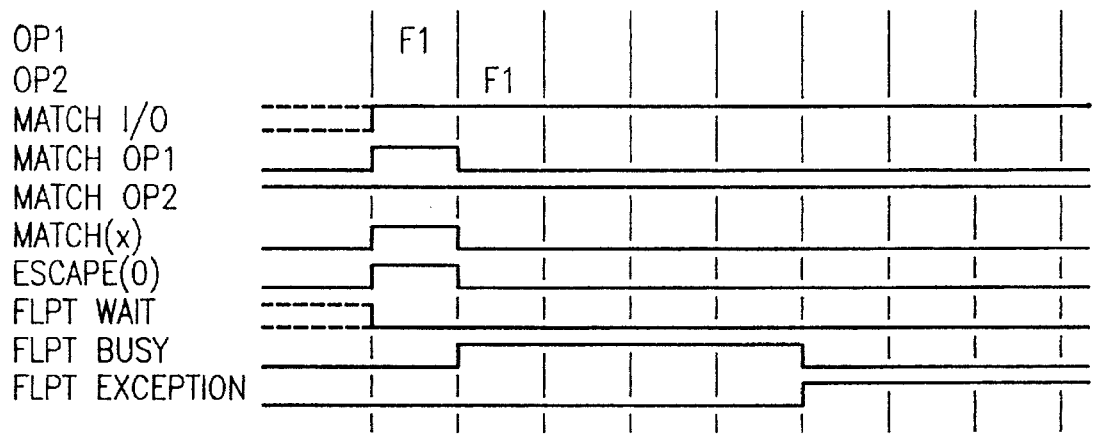
Figure 6B:
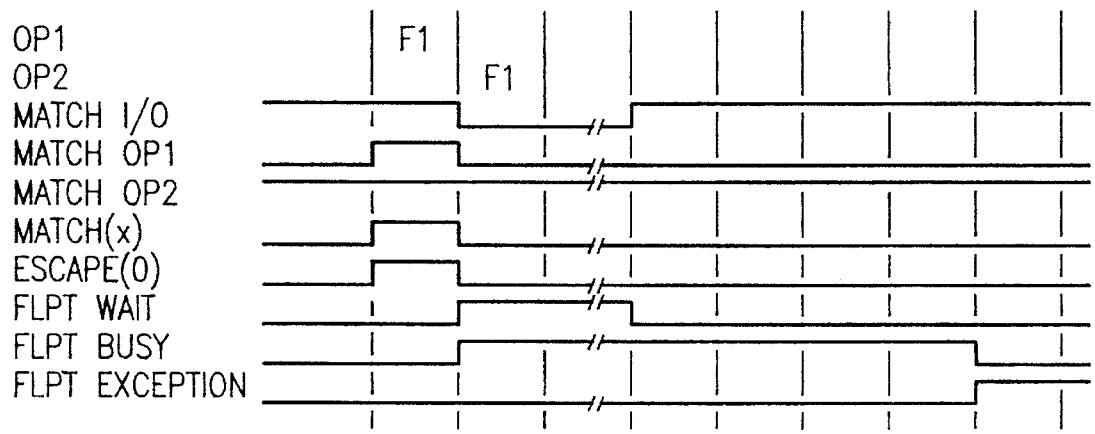
Figure 6C:
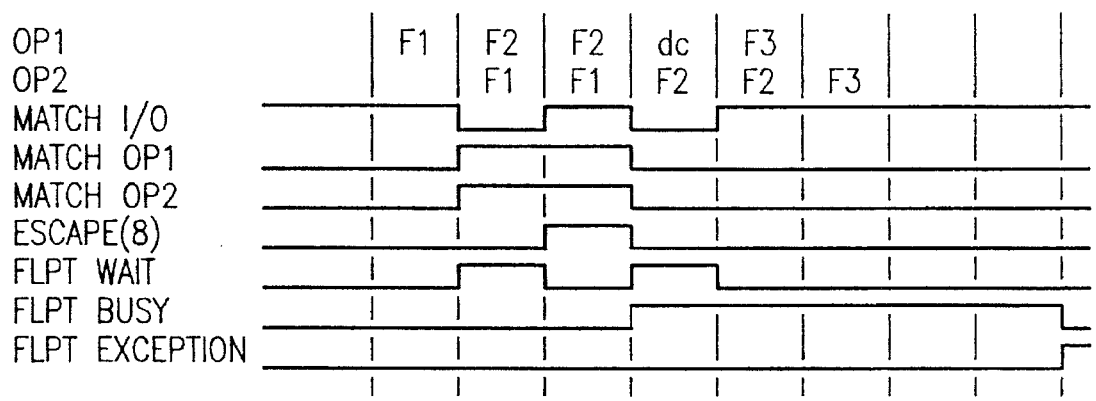
Figure 6D:
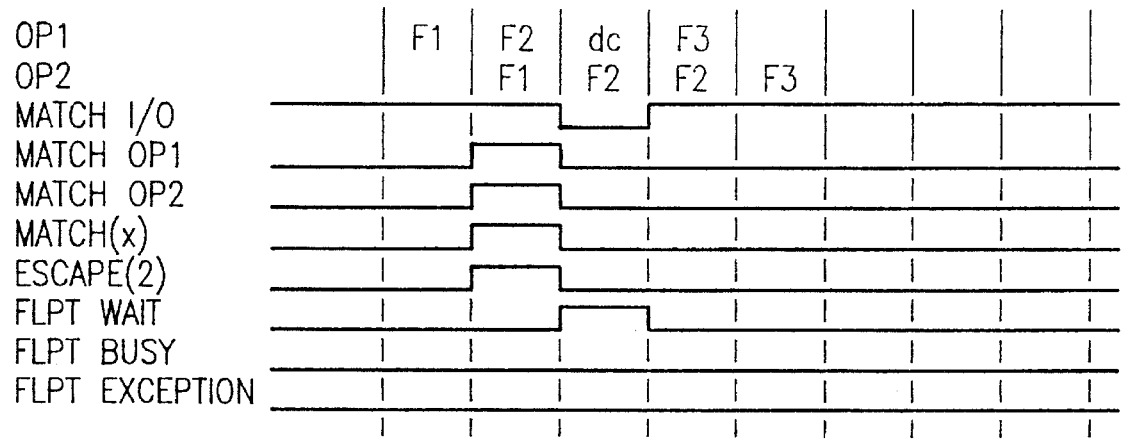
Figure 6E:
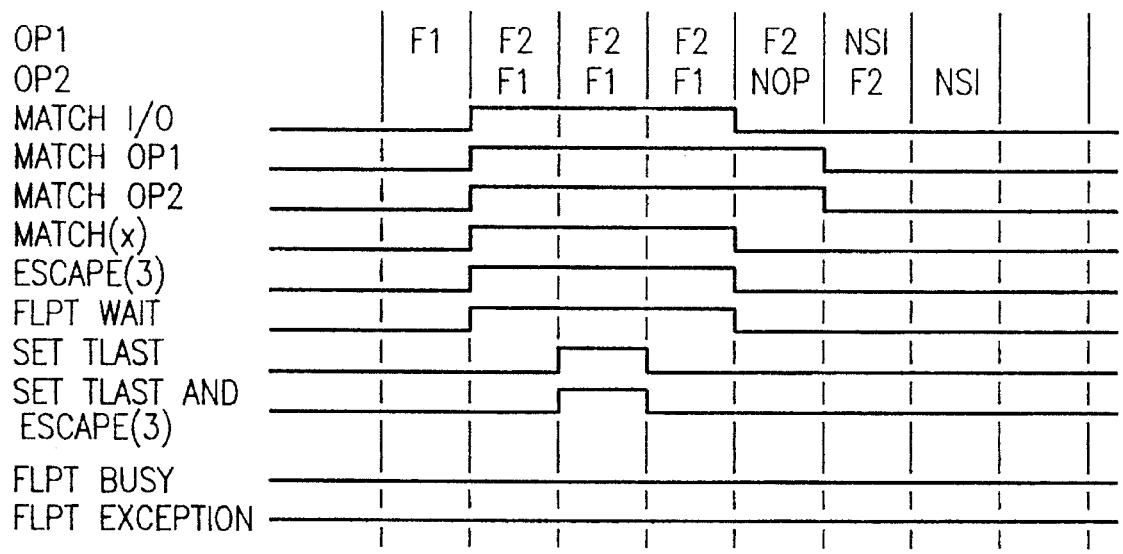
Figure 7:
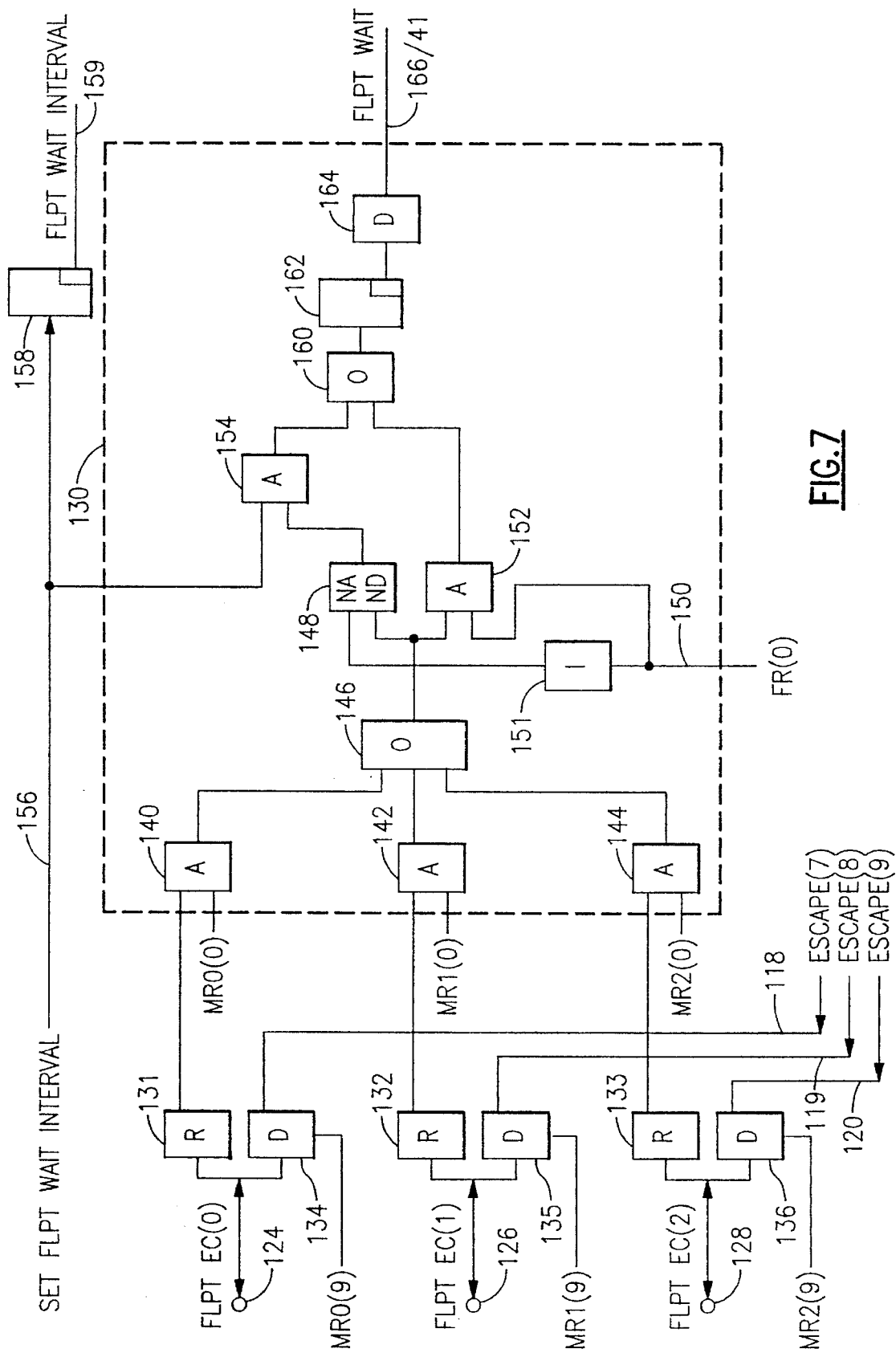
Figure 8A:
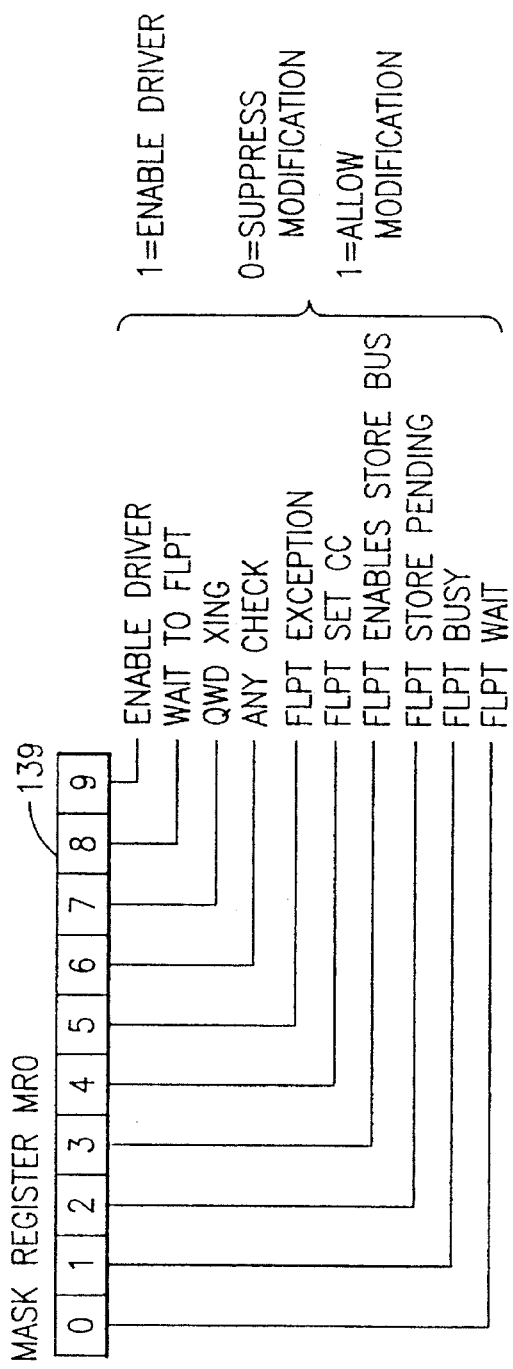
Figure 8B:
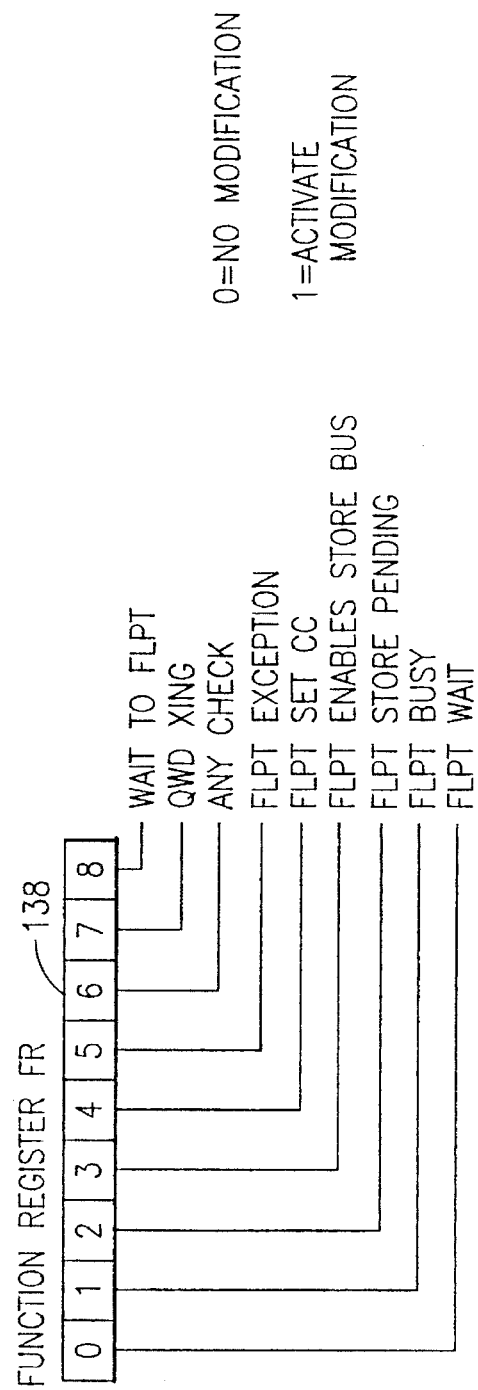
Figure 9:
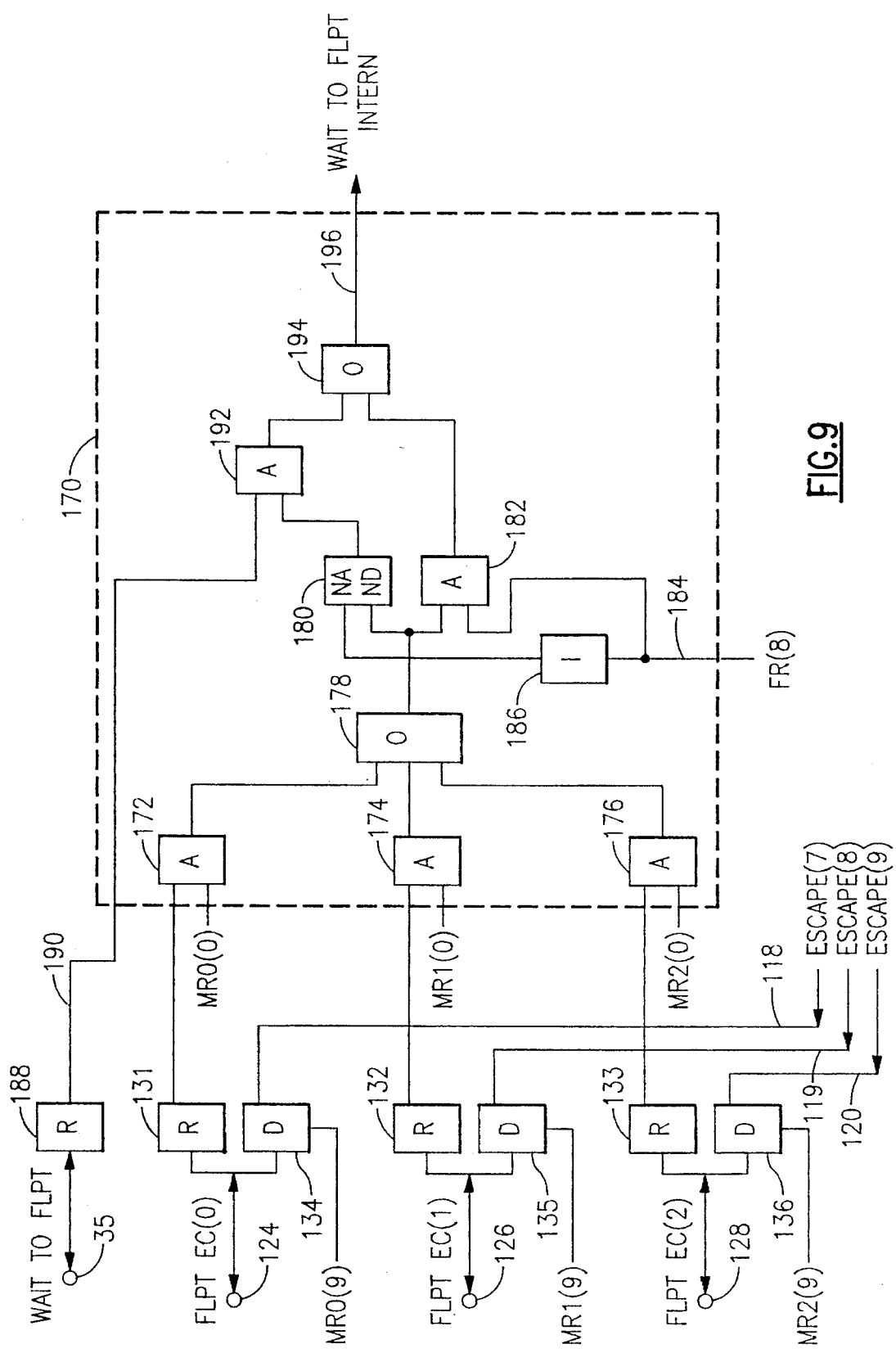

A preferred embodiment of the invention is subsequently described by reference to the drawings, wherein:

FIG. 1 is a block diagram of a multiprocessor computer system which contains a microprocessor chip according to the invention, FIG. 2 is a block diagram showing the interface lines of a processor chip in which the invention is implemented, FIG. 3 is a block diagram of an instruction and interface signal detector circuit a plurality of which is arranged on the chip of FIG. 2, FIGS. 4A to 4D are block diagrams showing the registers of the detector circuit according to FIG. 3 and the assignment of the register positions to the chip interface signals, FIG. 5 is a block diagram of a signal generator unit responsive to the output signals of the detector circuits to produce correction and modification signals effective in the control flow of the processor chip of FIG. 1 or of associated processors, FIGS. 6A to 6E are pulse diagrams related to the operation of the arrangement according to FIGS. 3 and 4, FIG. 7 is a block diagram of a circuit according to the invention to modify output interface signals, FIGS. 8A to 8B are block diagrams of a mask register and a function register respectively providing control signals for the circuits of FIG. 7, and FIG. 9 is a block diagram of a circuit according to the invention to modify input interface signals.

The computer system of FIG. 1 comprises a processor card 10 carrying a number of processor chips 12, 14, 16,17 and two memory chips 18, 19. Processor unit (PU) chip 12 and floating point processor (FLPT) chip 14 receive timing signals from clock chip 16 and are connected to random access memory chips which function as cache storages. The FLPT chip 14 functions as a mathematical coprocessor to the PU chip 12. The system further comprises a memory card 20 carrying storage controllers chips 21 and 22 connecting data buses 23, 24 from the cache storages 18 and 19 to a main memory 26 which consists of a number of random access memory chips. A memory bus adapter 17 located at the processor chip 10 connects the buses 23, 24 to other functional units such as I/O devices. The processors chips 12 and 14 are operating in the pipeline technique where the PU chip pipeline contains three pipeline stages which are extended to seven pipeline stages at the FLPT chip. This organization requires a tightly coupling of both processor chips 12 and 14. The PU 12 transmits instructions to the FLPT processor 14 for execution and also transmits some other control and status signals to the FLPT which in return transmits control and status signals to the PU 12. In addition data are transmitted in both directions between the FLPT processor 14 and the cache storages 18, 19.

FIG. 2 shows interface lines of the FLPT chip 14 through which the various transmissions take place. On the input side the interface lines comprise an eight byte data bus 30, a four byte instruction bus 32 (EFF OP1 Bus) and two bit operation mode control lines 33 (EFF MODE 1). Through these lines the FLPT processor 14 receives the OPCODES and the operand data of the instructions to be executed where the EFF MODE 1 lines 33 indicate the mode under which this execution takes place, i.e. the IBM System/390 mode, a microcode mode or a special forced operation mode. Furthermore, FLPT processor 14 receives status and control signals via input lines 34, 35 and 36. QWD XIND status line 34 indicates that the data to be processed are crossing a storage boundary having the consequence that an additional storage access is required which takes additional time. The WAIT TO FLPT control line 35 instructs the FLPT processor 14 to cancel the execution of instructions transmitted previously via the EFF OP1 bus 32. A three bit OP ADDR status line 36 indicates to the FLPT processor 14 the last three bits of the operand address to identify the starting point of the operand address in case of a deviation of the operand address from the predetermined storage boundaries, for example, in case of a storage boundary crossing indicated on line 34. On the output side the interface lines comprise an eight byte data bus through which the results of floating point operations are transmitted to the cache storages 18 or 19. Furthermore, FLPT processor 14 delivers status and control signals via interface output lines 41 to 48. FLPT WAIT control signal on line 41 indicates to the PU 12 that additional cycles are necessary to complete execution of a floating point operation, and it forces the FLPT processor 14 internally to ignore any new instruction on the EFF OP1 bus 32 except NOP instructions, i.e. instructions with a blank OPCODE consuming a machine cycle without performing any operation. FLPT BUSY status signal on line 42 indicates to PU 12 that the processor 14 is busy. Similarly, a FLPT STORE PENDING status signal on line 43 indicates to PU 12 that a storage access by processor 14 is pending and that no instruction may be issued to processor 14. A control signal FLPT ENABLES STORE BUS on line 44 takes over the control of the data bus to the cache storages 18,19 and indicates this control to the PU 12. A control signal FLPT SET CC on line 45 appears for instructions, the execution of which results in setting a condition code which then is indicated on the two bit FLPT CC status signal line 46. A control signal FLPT EXCEPTION appears on line 47 requesting an interrupt in the control flow of the PU 12. The FLPT Exception signal is accompanied by a signal from the FLPT status register (not shown) indicating the appropriate interrupt handling, for example, by starting a microcode routine. A signal N FLPT CHECK LT TO LT2 on line 48 indicates any check signal generated in the processor 14.

An embodiment of the invention is integrated in the processor chip 14. This embodiment comprises of a detector unit 50 (FIG. 3) for recognizing predetermined instructions in the control flow of this processor or a predetermined set of input/output control or condition signals. Detector unit 50 contains a compare circuit 52 which receives the control and status signals explained in connection with FIG. 2 as input signals through a bus 53. Another input of the compare circuit 52 is connected to the output of an I/O SELECT register 64. A third input of compare circuit 52 is connected to an I/O mask register 65, each bit position of which corresponds to a position of the register 64. By setting the mask register 65 certain portions of the contents of I/O SELECT register 64 may prevented from the comparison with the signals on bus 53. A zero bit in a position of register 65 excludes the corresponding bit position from the comparison while a one bit has no influence on the comparison of the corresponding bit position with the signals on bus 53. Thus, depending on the content of the mask register 65, a selected set of I/O select signals are compared by circuit 52 with the actual control and status signals appearing on bus 53. FIG. 4 shows the positions of registers 64 and 65 and the signal designation of their output lines. It may be seen that each output signal of register 65 corresponds to an output signal of register 64. The equal or non-equal signals from the output of compare circuit 52 are delayed by 0 to 3 cycles by a programmable delay circuit 55 which is designed as known from the prior art and which is controlled by two signals on line 61 from the control of the processor 14. The function of this circuit is to delay the output signals of another compare circuit 56 described below. The output signal of the delay circuit 55 is supplied to an AND-circuit 60.

A compare circuit 54 functions to recognize predetermined instructions in the control flow of processor 14 as it appears on a bus 57 and lines 58. Through bus 57 a part of the instruction supplied to processor 14 via EFF OP1 BUS 32 is transmitted to the compare circuit 54. This part takes 16 bits and represents the OPCODE of the instructions and the general register addresses. In addition, the EFF MODE1 control signals from lines 33 are transferred to the compare circuit via lines 58. A second input of compare circuit 54 is connected to an OP1 SELECT register 66 which will be set to contain a selected instruction and a selected mode of operation. A third input of the compare circuit 54 is connected to an OP1 mask register 67 the contents of which may prevent a portion of the contents of register 66 from participating in the comparison with the instruction and mode signals appearing on bus 57 and lines 58. Again, FIG. 4 shows the positions of registers 66 and 67 and the signal designation of their output lines. It may be seen that each bit of the instruction OP1, such as, for example, EFF OP1 BUS (0) which is the instruction bit in position 0 of register 66, and each MODE bit from register positions 16 and 17 may be selected solely or in combination for participating in the comparison.

As mentioned before, processor 14 operates in a pipeline technique where the execution of a new instruction will be started before the execution of the previous instruction has been completed. Processor 14 is organized to comprise seven pipeline stages. In the detector unit 50 only two of them are used. A compare circuit 56, operating in parallel to compare circuit 54, deals with the previous instruction OP2 of the control flow from bus 57 while the succeeding instruction OP1 appears on bus 57. The previous instruction OP2 is transmitted though a multiplexer 59 to an OP2 register 70 which is connected to a first input of compare circuit 56. An OP2 select register 68 and an OP2 mask register 69 are connected to the second and third inputs of compare circuit 56, respectively. There is a feedback branch between the output of register 70 and an input of multiplexer 59 forming a hold function for instruction OP2. A hold latch 74 provides via an inverter circuit 75 and an AND-circuit 76 an appropriate select signal to multiplexer 70 when the second input of AND-circuit 76 is conditioned by a HOLD OP2 signal derived from the FLPT WAIT control signal. The operation of registers 68 and 69 and compare circuit 56 corresponds to that of registers 66,67 and compare circuit 54 with the exception that the effective instruction which is subject of the comparison comes from register 70. Since the operation of compare circuit 56 takes place simultaneously to the operation of compare circuit 54, the detection process may be extended to two instruction in sequence.

The output signals of the compare circuits 52, 54 and 56 are combined by AND-circuit 60 which delivers a MATCH signal on its output line 78 indicating that an instruction and/or control/status signal combination as specified by the whole set of registers 64 to 69 has been detected. On the processor chip 14 there exist six detector units 50 and six sets of the associated registers 64 to 70. Each of these six detector units generate a MATCH signal corresponding to that on line 78 indicating the occurrence of a predetermined instruction flow and interface signal constellation. The match signals of the six detector units 50 are designated MATCH(0) to MATCH(5). These signals may be generated in parallel identifying simultaneously a plurality of error situations in the operation of processor chip 14. Alternatively, the number of detector units located on chip 14 may be higher or lower than six, depending on the objective and the ground floor space available on chip 14.

The MATCH(O) to MATCH(5) signals of said detector units 50 are transferred to input signals lines 100 of an escape logic unit 80 shown in FIG. 5. This escape logic unit comprises programmable connector circuits 81 to 89 assigning the MATCH(O) to MATCH(5) signals or a selected combination of them to the escape control lines 111 to 119. For this purpose each of the selected match signal lines 100 is connected through an AND-circuit to the input of the OR-circuit 108. In case of connector circuit 81 this connection is established by AND-gates 101 to 106 arranged at the input of OR-circuit 108. Six programmable latches 91, which function as a select register, are assigned to connector circuit 81 to selectively condition the second inputs of the AND-gates 101 to 106. Thus, by an appropriate setting of the latches 91 any combination of the MATCH(O) to MATCH(5) signals may be selected to activate control line ESCAPE(O). The connector circuits 82 to 89 have a similar design. Each of them has assigned set of latches 92 to 99 each of which consists of six latches as shown with regard to connector circuit 91. By this arrangement it is possible to selectively activate each of the control lines ESCAPE(1) to ESCAPE(9) by each of the MATCH(O) to MATCH(5) signals or any combination of them.

In FIG. 5 right of the output lines of circuit 80 there are indicated the corrective actions which are initiated by the various escape control signals. ESCAPE(O) produces a FLPT EXCEPTION control signal which is transferred via output line 47 (FIG. 2) to processor 12. Within the processor 14, signal ESCAPE(O) has the consequence that the execution of the current instruction is completed. ESCAPE(1) also produces an FLPT EXCEPTION control signal on line 47 but in this case without completing the current instruction. The ESCAPE (0) and (1) also sets one or more bits in the status register (not shown) of the processor 14 which indicate the type of interrupt. This information will be transmitted to the PU 12 by means of a well known read status register instruction issued by the PU 12 in response to the FLPT EXCEPTION signal. ESCAPE(2) forces a NOP instruction in the processor 14. ESCAPE(3) has the effect that a FLPT WAIT control signal on output line 41 will be extended by one machine cycle, and ESCAPE(4) and (5) do the same by two or three cycles, respectively. ESCAPE(6) disables the check facilities within the processor 14 to suppress incorrect check signals. ESCAPE(7) to (9) indicate certain conditions which, for example, may give the PU 12 additional information on the type of exception indicated by ESCAPE(O) and (1). Furthermore, these signals are used to modify input/output control signals as will be explained below in connection with FIG. 7 and 8. ESCAPE (7) and (8) are held by latches 121 and 122 which are set by the output signals of the connector circuits 88 and 89, respectively, where the output of connector circuit 89 itself represents the ESCAPE(9) signal. Subsequently, several error cases are described with reference to the pulse diagrams of FIG. 6.

Case 1:

An instruction must be suppressed, because the calculated result differs from the expected result. ESCAPE (1) initiates a FLPT EXCEPTION signal to the PU 12 to indicate the expected defect and to cause this instruction in microcode to be executed under the control of PU 12. The error correction facility according to the invention suppresses within the processor 14 the writing of data into the FLPT registers and—if appropriate—the settings of architectural exceptions and of the condition code and activates the corresponding bit position in the status register. The exception handler in the PU 12 initiates the execution of the same instruction in microcode.

Case 2:

An instruction is executed almost correctly, but, for example, the condition code setting is erroneously omitted. Here the instruction is completely executed by the processor 14 and only the result has to be corrected which takes less cycles than in case 1. Reference is made to FIG. 6A which shows a single cycle floating point instruction F1 without sequence dependence. A MATCH(x) signal is generated by one of the detector circuits 80 as consequence of a I/O match and an OP1 match detected by the compare circuits 52 and 54 of that detector circuit. The MATCH (x) signal is gated through connector circuit 81 to ESCAPE(O) line 111 to set the corresponding position of the status register and to prepare the FLPT EXCEPTION signal which, however, is only transmitted to the PU 12 after the FLPT BUSY signal declines indicating that the instruction execution is completed. The result is than corrected by microcode under the control of PU 12.

A similar process is shown by FIG. 6B which relates to a multicycle instruction F1 after a single cycle instruction without sequence dependence. FIG. 6C shows a multicycle instruction F1 after a multicycle instruction F2 with sequence dependence between both instructions.

Case 3:

A NOP instruction (no operation instruction) has to be inserted between consecutive FLPT instruction to avoid a sequence dependence problem (FIG. 6D). Consecutive instructions F1,F2 have a data dependence in a pipelined microprocessor, if they access the same floating point registers as source and target. The result of the execution of the first instruction F1 is written to the floating point registers and in parallel also back to the pipeline as operands of the second instruction F2. If there arises an interference problem during the writeback operation, a NOP instruction rectifies the operand stream and removes the data dependence since it delays the start of the second instruction by one cycle. This is shown in FIG. 6D by the third cycle which represents the NOP instruction initiated by an ESCAPE(2) signal on line 113 (FIG. 5) which appears in the second cycle when an OP1 and OP2 match situation has been detected by one of the detector units 50.

Cases 4, 5 and 6:

The control signal FLPT WAIT is extended by one to three cycles (FIG. 6E). FLPT WAIT indicates to the processing unit 14 the execution of floating point instructions with more than one cycle. By extending the FLPT WAIT signal the instruction execution has more cycles available. This action is used to clean the pipeline and to avoid sequence dependence problems. This is shown in FIG. 6E which relates to a single cycle instruction after a multicycle instruction with sequence dependence. The FLPT WAIT control signal on line 41 is extended by one cycle as consequence of an ESCAPE(3) signal generated in the second cycle as result of a combined I/O, OP1 and OP2 match in one of the detector units 50. This process may also be used to force status signals to avoid timing problems between the processors 14 and 12, i.e. if there is a problem with the physical timing of the status line.

Case 7:

The setting of the check latch (not shown) is suppressed. A hardware check such as a parity check or a residue check has the consequence of a clock stop. If such check occurs unwarranted, a lengthy initialization process is necessary to restart the system.

Cases 8, 9 and 10:

A match of the detection facility according to the invention is indicated at an module pin. Three module pins 124, 126, 128 are provided to indicate certain conditions identified by the detector units 50. If in special situations an off-chip correction according to the prior art should be necessary, the detection units 50 may be used to identify certain system conditions by means of the fast programmability of the registers 64 to 69 and 98,99. For such applications the ESCAPE(7) to (9) signal lines 118 to 120 are connected via driver circuits 134 to 136 to FLPT EC(0) to FLPT EC(3) pins 124, 126, 126 provided for off-chip engineering change operations (FIG. 7).

Independently of the correction operations described, the method and device according to the invention allow modification of the interface signals of processor 14 according to external requirements, i.e. changes in associated chips or their replacement by other chips having different interface characteristics. Examples of such interface modifications are shown in FIGS. 7 to 9. An output interface modification circuit 130 modifying the control signal FLPT WAIT, which appears on the interface output line 41, is shown in FIG. 7. Circuit 130, which is located on the processor chip 14, receives control signals from registers 138 and 139 shown in FIGS. 8A and 8B respectively. Register 138 is a function register (FR) the bit positions of which are assigned to the interface control and status signals of processor 14 as explained in connection with FIG. 2. For example, register position 0 is assigned to the FLPT WAIT signal. Accordingly, register 139 is a mask register (MR) associated with the function register 138. The bit positions of mask register 139 are assigned to the same interface control and status signals. A "0" bit in a bit position of register 139 suppresses any modification of an interface control and status signal while a "1" bit allows such modification. The output interface signal modification circuit 130 is assigned to the FLPT WAIT signal. It is thus controlled by signals derived from the bit position 0 of registers 138, 139. Accordingly, a corresponding interface modification circuit is provided on processor chip 14 for each one of the interface control and status signal lines of this chip. Another example shown herein is the input interface signal modification circuit 170 of FIG. 9.

Circuit 130 receive from the escape logic 80 of FIG. 5 ESCAPE(7) to ESCAPE(9) signals on lines 118, 119, 120 which are connected to driver circuits 134, 135, 136. If enabled by a "1" signal on a control input, these drivers transfer the ESCAPE(7) to ESCAPE(9) signals from lines 118 to 120 to both the engineering change pins 124, 126, 128 for off-chip use as described above and to receiver circuits 131, 132, 133 which function as amplifiers. The control signals of the driver circuits 134, 135 136 are derived from the bit position 9 of the mask registers MR0, MR1 and MR2. If these positions contain a "1" bit, the driver circuits 134, 135 136 are enabled for a transfer of the corresponding input signal. In FIG. 8A only mask register MR0 is shown which is assigned to ESCAPE(7) signal. However, in accordance with the number of the ESCAPE signals involved in the interface signal modification, there exist another two mask registers MR1 and MR1 of the same sort having the same register to output signal assignment as register 139. Mask registers MR1 and MR2 are related to the ESCAPE(8) and ESCAPE(9) signals, respectively. This multiplication of the mask register increases the flexibility of the interface signal modification and allows to use any of the ESCAPE(8) and ESCAPE(9) signals or any combination of them to initiate a modification of a selected interface signal. It is noted that the function register 138 and the three mask registers MR0, MR1 and MR1 may be selectively loaded by program. In the embodiment shown, this is done through programmable shift register operations by using a LSSD shift register chain according to the prior art.

The outputs of the receiver circuits 131, 132, 133 are connected to AND-circuits 140, 142, 144, respectively, which receive on their second inputs conditioning signals from the bit position 0 of the mask registers MR0, MR1, MR2. An OR-circuit 146 transfers the output signals of the AND-circuits 140, 142, 144 to a NAND-circuit 148 and an AND-circuit 152 which are conditioned by an output signal of bit position 0 of the function register 138. This signal appears on line 150 which is connected to AND-circuit 152 and via an inverter circuit 151 to NAND-circuit 148 the output of which is connected to an AND-circuit 154. The latter receives on its second input via line 156 a SET FLPT WAIT signal which is an internal control signal of processor 14 to set a latch 158 to produce on a line 159 a FLPT WAIT INTERNAL signal used as an internal control signal of the processor 14. The outputs of the AND-circuits 152 and 154 are effective through an OR-circuit 160 to set a latch 162 which generates via a permanently enabled driver 164 the interface output control signal FLPT WAIT on a line 166 which is identical with line 41 in FIG. 2. Latch 160 has a clock input (not shown) which resets this latch at the end of each machine cycle. The AND-circuits 152, 154 and OR-circuit 160 function as a multiplexer by transferring alternatively the internal control signal SET FLPT WAIT or the modification control signal FR(0) to latch 160. The SET FLPT WAIT signal provides for an unmodified output control signal on line 166 (41) according to the agreed interface specification of the processor chip 14. In this mode, the output of OR-circuit 146 and line 150 are low. NAND-circuit 148 conditions AND-circuit 154 to transfer the SET FLPT WAIT signal to latch 162. If, instead, a FR(0) signal appears on line 150, a modification of the FLPT WAIT signal is forced depending on the an ESCAPE(7), ESCAPE(8) or ESCAPE(9) signal on line 118, 119 or 120 where ESCAPE(7) and ESCAPE(8) may be maintained for more than on machine cycle by the latches 121 and 122 (FIG. 5). Through the corresponding AND-circuit 140, 142 or 144 and OR-circuit a modification control signal is transferred by AND-circuit 152 via OR-circuit 160 to latch 162 to produce an FLPT WAIT signal on line 166 (41). This may happen independently of the internal SET FLPT WAIT signal to insert a FLPT WAIT signal, or subsequently to the internal SET FLPT WAIT signal to extent this signal by one or more machine cycles. By an 1-signal from bit position FR(0) of the function register 138 accompanied by a 0-bit in the bit positions MR0(0), MRI(0), MR2(0) both AND-circuits 152 and 154 remain unconditioned whereby a FLPT Wait signal may be suppressed.

FIG. 9 shows an input interface modification circuit 170 modifying the control signal WAIT TO FLPT which appears on the interface input line 35. The circuit of FIG. 9 uses the same input circuitry as FIG. 7, i.e. ESCAPE(7) to ESCAPE(9) signals on lines 118 to 120 are delivered via drivers 134 to 136 and receivers 131 to 133 to circuit 170 which has a similar design as circuit 130 in FIG. 7. An input interface signal WAIT TO FLPT appears on line 35 and is transferred through a receiver circuit 188 and line 190 to AND-circuit 192. If the bit position 8 of function register 138 is set to 0, line 184 is low and by means of the inverter 186 the AND-circuit 192 is conditioned to transfer the WAIT TO FLPT signal via OR-circuit 194 to line 196 for internal use in the processor chip 14. If, on the other hand, bit position 8 of register 138 is set to 1 and simultaneously on of the mask registers MR1 to MR2 (see register 139) includes a 1-setting in bit position 0, AND-circuit 182 is conditioned to transfer a modification signal initiated by an ESCAPE(7) to ESCAPE(9) signal on lines 118 to 120 to line 196 to serve as internal WAIT TO FLPT signal in the processor chip 14. Again, this signal may extend or replace the regular WAIT TO FLPT signal line 190.

Similar circuits are provided for the other input and output interface control and status signals of chip 14 as indicated by the output lines of FR register 138 and MR0 register 139 in FIG. 8. However, from the operation of circuits 130 and 170 it will become clear that the interface signal modification facility described allows the adaptation of the appearance of the processor chip 14 to its environment. If there is a change in the interface of one of the associated components, such as, for example, of processing unit 12, the processor chip 14 may be easily adapted by a corresponding modification of its interface. Such adaptation is done without the need of a time consuming hardware redesign by programming the registers MR0, MR1, MR2 and FR.

We claim:

1. A method for correction and modification of microprocessor chip operation in a computer system having a number of processors and storage chips connected among each other via interfaces, said method comprising the steps of:

(a) comparing on processor chip level an erroneous instruction flow with a number of items selected from the group consisting of predetermined instructions and predetermined sequences of instructions, and simultaneously comparing a set of interface control and status signals with a number of predetermined sets of interface status signals;

(b) assigning comparison match results obtained in step (a) to selected escape conditions and initiating an action selected from the group consisting of
 (i) an interference with the internal control flow of the microprocessor chip to take a corrective action,
 (ii) an interrupt request to an associated processing unit performing a sequence of corrective operations, where said sequence controls the microprocessor chip or takes over certain microprocessor chip functions, and
 (iii) a modification of preselected interface signals;

(c) reprogramming the microprocessor chip to select a set of instructions and interface control and status signals for comparisons according to step (a) and to adjust the assignment of said match results from step (a) to certain escape conditions of step (b) according to requirements for correction and modification as needed and to determine type and manner of said modification of preselected interface signals; and (d) repeating steps (a) to (c) until appropriate requirements for correction and modification, as needed, have been achieved.

2. The method according to claim 1 further comprising the step of selectively masking out certain portions of preselected instructions and of interface status signals to preclude said portions from affecting the comparisons of step (a).

3. The method according to claim 1 wherein said interference with the internal control flow of the microprocessor chip comprises insertion or suppression of instructions or sequences of instructions.

4. The method according to claim 1, wherein said interface signal modification comprises extension, shortening, insertion or suppression of input and output interface status signals.

5. The method according to claim 1, further comprising the step of selectively masking out certain interface signals for modification under one of the escape conditions.

6. A device for correction and modification of single chip microprocessor operations in microprocessors having interface lines for exchange of data, control and status signals with other components of a computer system including associated processor and storage chips, said device comprising:

(a) detector means for identifying predetermined instructions or sequences of instructions and operation mode information in an erroneous control flow of the microprocessor chip and for identifying predetermined sets of interface control and status signals of the microprocessor chip, wherein said detector means generate a match signal for each successful identification operation;

(b) programmable register means, which is connected to said detector means, said programmable register means containing a first select register settable according to a selected combination of interface control and status signals, and further containing a second register and a third select register which are programmable according to selected instructions of the microprocessor instruction set, and even further containing mask registers associated with one of said select registers settable to selectively mask out certain portions of said instructions and of said combinations of interface signals from participating in said identification operation;

(c) logic means for selectively assigning said match signals to escape control lines to initiate an action selected from the group consisting of (i) an interference with the control flow of the microprocessor chip, (ii) an interrupt request to an associated processing unit performing a sequence of corrective operations, and (iii) a modification of preselected interface signals;

(d) programmable register means which is connected to said logic means, said programmable register means being settable to contain the control information to establish and maintain a selective assignment between match signal inputs of said logic means and output lines of said logic means to generate an appropriate escape control signal for initiating a corrective action.

7. The device according to claim 6, further comprising a plurality of detector means for identifying predetermined combinations of sets of selected instructions and operation mode information in the data flow of the microprocessor chip and for simultaneously identifying predetermined combinations of sets of selected interface control and status signals of the microprocessor chip, wherein said plurality of detector means generate simultaneously a set of match signals to indicate in combination success in a complex identification operation, and comprising sets of programmable select registers and sets of programmable mask registers connected to a set of detector means to program said plurality of detector means to perform a complex identification operation.

8. The device according to claim 6, further comprising a plurality of programmable register means, which is connected to said logic means, said programmable register means being settable to contain control information to establish and maintain a selective assignment between said set of match signals and each of the output lines of said logic means to generate appropriate escape control signals for initiating corrective actions.

9. The device according to claim 6, further comprising:

(a) a plurality of programmable interface modification means, which is assigned to the interface control and status lines of the microprocessor chip, said programmable interface modification means containing logic means which receive as input signals an interface control and status signal, and a modification control signal to produce a regular and modified interface status and control signals, as needed; and (b) programmable register means which is connected to said interface modification means, said programmable register means containing a function select register settable according to a selected combination of interface control and status signals to be modified and providing control signals to said logic means, said programmable register means further containing mask registers associated with one of said escape control signals to allow or suppress the generation of a corresponding modification control signal.

10. The device according to claim 6, wherein modification control signals urge said logic means to perform an operation selected from the group consisting of extending, shortening and suppressing said interface control and status signals or to insert new interface control and status signals.

11. The device according to claim 6, wherein a subset of said escape control lines are connected to engineering change pins for off-chip processing.

12. The device according to claim 6, wherein said register means are part of a level sensitive scan design and are loaded by shift register operations initiated by an associated processing unit.

* * * * *